United States Patent
Ikeda et al.

(10) Patent No.: US 10,474,019 B2
(45) Date of Patent: Nov. 12, 2019

(54) PHOSPHOR DISC, PHOSPHOR WHEEL, LIGHT SOURCE DEVICE, PROJECTION DISPLAY APPARATUS, AND MANUFACTURING METHOD OF PHOSPHOR DISC

(71) Applicant: Panasonic Intellectual Property Management Co., Ltd., Osaka (JP)

(72) Inventors: Takashi Ikeda, Osaka (JP); Masafumi Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/196,457

(22) Filed: Nov. 20, 2018

(65) Prior Publication Data

US 2019/0086780 A1 Mar. 21, 2019

Related U.S. Application Data

(63) Continuation of application No. 15/646,628, filed on Jul. 11, 2017, now Pat. No. 10,162,252.

(30) Foreign Application Priority Data

Jul. 28, 2016 (JP) .................................. 2016-148144
Apr. 11, 2017 (JP) .................................. 2017-077970

(51) Int. Cl.
*F21V 9/30* (2018.01)
*G03B 21/20* (2006.01)
*B32B 7/12* (2006.01)
*B32B 15/04* (2006.01)
*B32B 37/10* (2006.01)

(Continued)

(52) U.S. Cl.
CPC .............. *G03B 21/204* (2013.01); *B32B 7/12* (2013.01); *B32B 15/04* (2013.01); *B32B 37/10* (2013.01); *F21V 9/30* (2018.02); *G02B 26/008* (2013.01); *H04N 9/31* (2013.01); *B32B 2038/0076* (2013.01); *B32B 2250/02* (2013.01); *B32B 2307/422* (2013.01); *B32B 2309/02* (2013.01); *B32B 2311/24* (2013.01);

(Continued)

(58) Field of Classification Search
CPC .. G03B 21/204; H04N 9/3158; H04N 9/3111; H04N 9/31; B32B 15/04; B32B 26/008; B32B 2551/00; B32B 2311/24; B32B 2250/12; B32B 2307/422; F21V 9/30
USPC ........................................................... 362/84
See application file for complete search history.

(56) References Cited

U.S. PATENT DOCUMENTS 10,162,252 B2* 12/2018 Ikeda .................. G03B 21/204
2012/0106126 A1* 5/2012 Nojima ................ G02B 26/008
362/84

(Continued)

FOREIGN PATENT DOCUMENTS

JP 2013-228598 11/2013
JP 2017-167521 9/2017

*Primary Examiner* — Ali Alavi
(74) *Attorney, Agent, or Firm* — Wenderoth, Lind & Ponack, L.L.P.

(57) ABSTRACT

The phosphor disc disclosed here includes the following structural elements: a disc-shaped metal plate; a phosphor layer disposed circumferentially on the metal plate; and a bonding layer for bonding the phosphor layer to the metal plate. The metal plate curves convexly toward the phosphor layer.

13 Claims, 9 Drawing Sheets

(51) Int. Cl.
   *G02B 26/00*    (2006.01)
   *H04N 9/31*     (2006.01)
   *F21Y 115/30*   (2016.01)
   *B32B 38/00*    (2006.01)

(52) U.S. Cl.
   CPC ....... *B32B 2313/00* (2013.01); *B32B 2551/00* (2013.01); *F21Y 2115/30* (2016.08)

(56) References Cited

U.S. PATENT DOCUMENTS

| | | | |
|---|---|---|---|
| 2013/0088471 A1* | 4/2013 | Kitano | H04N 9/3114 345/208 |
| 2013/0286359 A1 | 10/2013 | Motoya et al. | |
| 2015/0036107 A1* | 2/2015 | Nagahara | G03B 21/208 353/31 |
| 2016/0062221 A1* | 3/2016 | Matsubara | G03B 21/2013 353/31 |
| 2017/0237953 A1* | 8/2017 | Akiyama | H04N 9/3114 353/31 |
| 2017/0269461 A1 | 9/2017 | Ikeda | |

\* cited by examiner

PHOSPHOR DISC, PHOSPHOR WHEEL, LIGHT SOURCE DEVICE, PROJECTION DISPLAY APPARATUS, AND MANUFACTURING METHOD OF PHOSPHOR DISC

BACKGROUND

Technical Field

The present disclosure relates to a phosphor disc forming a phosphor wheel to be used in a light source device of, for instance, a projection display apparatus, and it also relates to a method for manufacturing the phosphor disc.

Description of the Related Art

Patent literature 1 discloses a disc of a phosphor wheel of which disc includes a titanium oxide layer thereon and a phosphor layer disposed on the titanium oxide layer. This phosphor wheel comprises the following structural elements:

an excitation light source;
a fluorescent emitting section disposed opposite to the excitation light source; and
a fluorescent emitting substrate including a reflecting section made of titanium oxide, and disposed opposite to the excitation light such that it is bonded to the fluorescent emitting section.

The foregoing structure allows irradiating the fluorescent emitting section with an excitation light supplied from the excitation light source. This irradiation allows the fluorescent emitting section to emit a fluorescent light, and the reflecting section to emit a reflection fluorescent light. A reflectance of the fluorescent light can be thus improved, so that the reflection light can be used more efficiently. On top of that, the cost of the phosphor wheel can be lowered.

CITATION LIST

Patent Literature 1: Unexamined Japanese Patent Application No. 2013-228598

SUMMARY

The present disclosure provides a phosphor disc of which deformation in use is minimized.

The phosphor disc disclosed here includes the following structural elements: a disc-shaped metal plate; a phosphor layer disposed circumferentially on the metal plate; and a bonding layer for bonding the phosphor layer to the metal plate. The metal plate curves convexly toward the phosphor layer.

A method for manufacturing a phosphor disc disclosed here includes the steps of: a step of disposing a disc-shaped metal plate, having a first face covered with a thermosetting bonding layer formed circumferentially, on a base such that a second face of the disc-shaped metal plate is brought into contact with a mounting face of the base for a phosphor layer to be located on the bonding layer; a step of bonding the phosphor layer and the metal plate together by placing a weight on the phosphor layer; and a step of curing the bonding layer with heat following a removal of the weight after the phosphor layer and the metal plate are bonded together, and leaving, for a given time, the metal plate bonded with the phosphor layer at a temperature to be employed during an actual use. After the step of curing, the metal plate bonded with the phosphor layer curves convexly toward the first face at a room temperature due to a difference in linear expansion coefficients between the phosphor layer and the metal plate.

Another method for manufacturing a phosphor disc disclosed here includes the steps of; a step of disposing a phosphor layer on a base such that a first face of the phosphor layer is brought into contact to a mounting face of the base, and disposing a metal plate having one side covered with a thermosetting bonding layer such that the bonding layer is brought into contact to a second face of the phosphor layer; a step of bonding the phosphor layer and the metal plate together by placing a weight on the metal plate; and a step of curing the bonding layer with heat following a removal of the weight after the phosphor layer and the metal plate are bonded together, and leaving, for a given time, the metal plate bonded with the phosphor layer at a temperature to be employed during an actual use. After the step of curing, the metal plate bonded with the phosphor layer curves convexly toward the first face at a room temperature due to a difference in linear expansion coefficients between the phosphor layer and the metal plate.

The structures discussed above achieve the phosphor disc that can be actually used with least deformation.

DETAILED DESCRIPTION OF THE PREFERRED EMBODIMENT

Exemplary embodiments of the present disclosure are detailed hereinafter with reference to the accompanying drawings. Descriptions more than necessary can be omitted. For instance, well-known matters are not necessarily described, or duplicated descriptions of substantially the same structural elements can be omitted in order to avoid redundancy, and help ordinary skilled person in the art readily understand the present disclosure.

The accompanying drawings and the descriptions hereinafter are provided for the ordinary skilled person in the art to fully understand the present disclosure. Nevertheless these materials will not limit the scope of the claims.

Figure 1A:
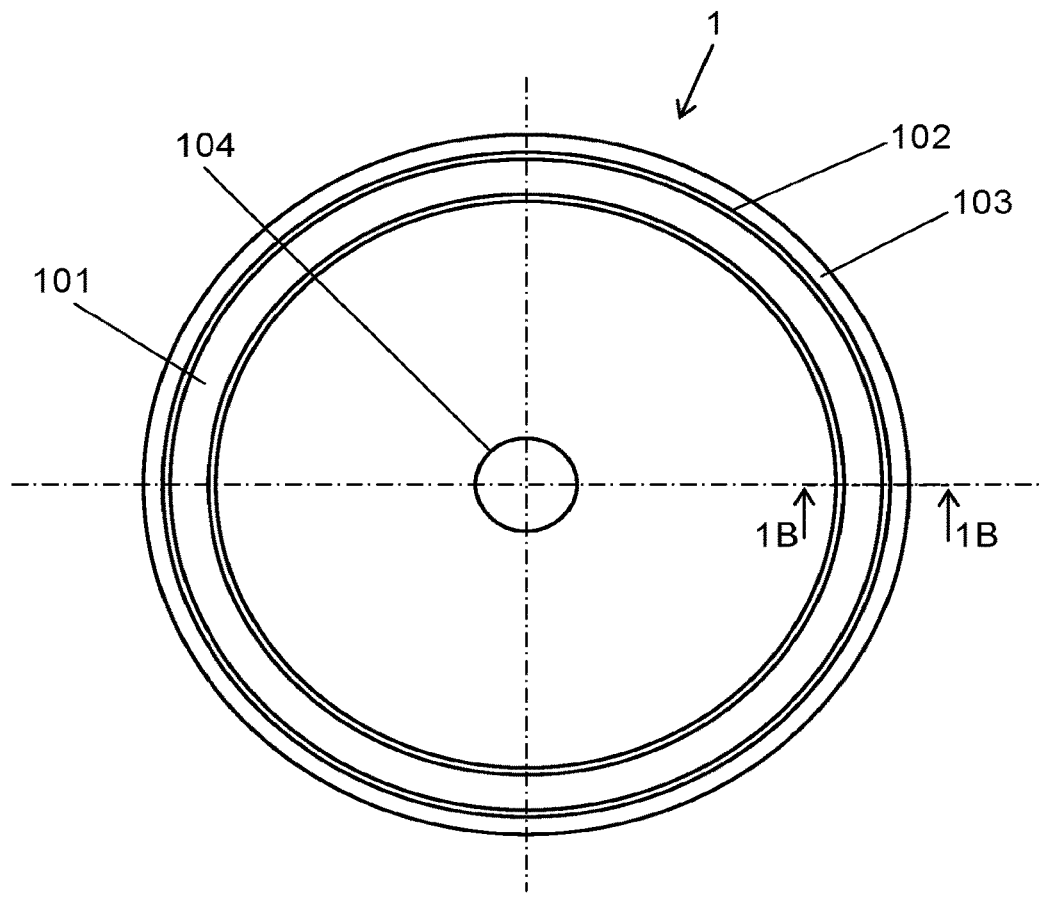
FIG. 1A shows a structure of a phosphor disc in accordance with the first embodiment.
Figure 1B:
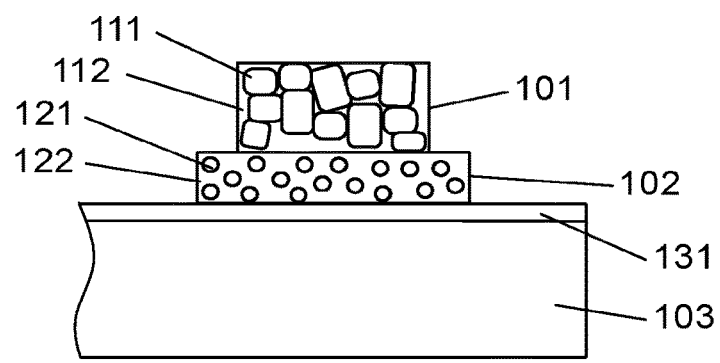
FIG. 1B is a sectional view of the phosphor disc cut along line 1B-1B in FIG. 1A.

First Exemplary Embodiment 1-1. Structure of Phosphor Disc and Manufacturing Method Thereof The structure and the manufacturing method of the phosphor disc in accordance with the first embodiment are described hereinafter with reference to FIG. 1A-FIG. 4B. FIG. 1A and FIG. 1B illustrate the structure of phosphor disc 1 in accordance with the first embodiment. FIG. 1A is a plan view and FIG. 1B is a sectional view cut along line 1B-1B in FIG. 1A.

Phosphor disc 1 includes disc-shaped metal plate 103 made of aluminum. Mounting hole 104 is at the center of disc-shaped metal plate 103 to mount a rotary shaft of motor 141 (refer to FIG. 5). Mounting the motor 141 to phosphor disc 1 will form phosphor wheel 100, and then phosphor disc 1 can be driven to rotate by motor 141. At least on a surface of the single side of metal plate 103, increased reflecting film layer 131 formed of an undercoat and a topcoat (not shown) is formed. Disc-shaped metal plate 103 made of aluminum is an example of a metal plate.

As FIG. 1A shows, on increased reflecting film layer 131 of disc-shaped metal plate 103, bonding layer 102 is annularly formed along the circumference, viz. equidistantly from the rotary center of metal plate 103. This bonding layer 102 has a constant width and a constant thickness. As FIG. 1A shows, phosphor ring 101 is annularly formed on bonding layer 102.

Phosphor disc 1 is detailed hereinafter with reference to FIG. 1B. Bonding layer 102 formed on increased reflecting film layer 131 of disc-shaped metal plate 103 is made of thermosetting resin silicone 122 that contains particles 121, which is expected to increase reflectance and heat conductivity. Particles 121 made of titanium oxide is used in this embodiment.

Phosphor ring 101 is made of a mixture of phosphor 111 (inorganic phosphor) and alumina 112, and is sintered into a ring shape having a constant width and a constant thickness. Sintered phosphor ring 101 is rigidly bonded to disc-shaped metal plate 103 with bonding layer 102. Phosphor ring 101 is an example of the phosphor layer.

It is preferable to use the thermosetting resin silicone as a resin bonding agent in bonding layer 102 because this material can reduce a distortion caused by a difference in liner expansion coefficients between metal plate 103 and phosphor ring 101 forming the phosphor layer. This structure allows maintaining the structure of the phosphor disc. Considering the characteristics of reducing the distortion, it is preferable to use dimethyl based thermosetting resin silicone in the bonding layer.

A method for manufacturing the phosphor disc in accordance with this first embodiment is described hereinafter with reference to FIG. 2(a)-FIG. 2(h). These drawings schematically show sectional views of phosphor disc 1 cut along a diameter line.

First, as FIG. 2(a) shows, move the disc-shaped metal plate 103, on which the first face that the bonding layer 102 is formed circumferentially, along the arrow. Then as FIG. 2(b) shows, place the metal plate 103 on base 201 such that the second face of metal plate 103 is brought into contact with mounting face 201a of base 201 that is used as a bonding base.

Next as FIG. 2(c) shows, an alignment is done from the above between phosphor ring 101 and bonding layer 102 with disc-shaped metal plate 103 being placed on base 201, and then phosphor ring 101 is moved along the arrow to be placed on bonding layer 102 as shown FIG. 2(d). This step is referred to as a step of placing.

Then as FIG. 2(e) shows, place weight 202 on phosphor ring 101 mounted to bonding layer 102, and move weight 202 along the arrow to be placed on phosphor ring 101 as shown in FIG. 2(f) so that phosphor ring 101 can be strongly bonded to disc-shaped metal plate 103. This step is referred to as a step of bonding.

Then weight 202 is removed, and phosphor disc 1 placed on base 201 is put into constant temperature oven 90, as FIG. 2(g) shows. The temperature of oven 90 has been set around a normal use temperature (i.e. the temperature during the actual use). Then the foregoing members are left for a given time to cure the bonding agent with heat. This step is referred to as a step of curing. In this context, "the temperature during the actual use" refers to a temperature at which a projection display apparatus that includes the light source device uses the phosphor wheel and the phosphor disc is formed, is in use. In this first embodiment, the bonding agent is cured in an atmosphere of 100-200° C.

Next, phosphor disc 1 is taken out from constant temperature oven 90 to restore the temperature of phosphor disc 1 to a room temperature. Then as FIG. 2(h) shows, phosphor disc 1 curves convexly, viz. the face of phosphor disc 1 provided with phosphor ring 101 protrudes due to a difference in linear expansion coefficients between phosphor ring 101 and metal plate 103.

In the foregoing description, phosphor ring 101 can be placed on metal plate 103 provided with bonding layer 102; however, metal plate 103 provided with bonding layer 102 can be bonded onto phosphor ring 101 from the above. This another method for manufacturing phosphor disc 1 is described hereinafter with reference to FIG. 3(a)-FIG. 3(h). These drawings schematically show sectional views of phosphor disc 1 cut along a diameter line.

First, as FIG. 3(a) shows, move phosphor ring 101 along the arrow to be placed on base 201 such that the first face of phosphor ring 101 is brought into contact to mounting face 201a of base 201 as shown in FIG. 3(b). Then as FIG. 3(c) shows, an alignment is done between phosphor ring 101 and metal plate 103 on which the first face that thermosetting bonding layer 102 is formed. Move metal plate 103 along the arrow such that bonding layer 102 is brought into contact to the second face of phosphor ring 101 as shown in FIG. 3(d). This step is referred to as a step of placing.

Second, as FIG. 3(e) shows, move weight 202 along the arrow to be placed on metal plate 103 so that phosphor ring 101 can be bonded to metal plate 103 as shown in FIG. 3(f). This step is referred to as a step of bonding.

Then weight 202 is removed, and phosphor disc 1 placed on base 201 is put into constant temperature oven 90, as FIG. 3(g) shows. The temperature of oven 90 has been set around the normal use temperature (i.e. the temperature during the actual use). Then the foregoing members are left for a given time to cure the bonding agent with heat. This step is referred to as a step of curing. In this method, the bonding agent is cured in an atmosphere of 100-200° C., similarly to the manufacturing method shown in FIG. 2(g).

Next, phosphor disc 1 is taken out from constant temperature oven 90 to restore the temperature of phosphor disc 1 to a room temperature. Then as FIG. 3(h) shows, phosphor disc 1 curves convexly, viz. the face of phosphor disc 1 provided with phosphor ring 101 protrudes due to a difference in linear expansion coefficients between phosphor ring 101 and metal plate 103.

1-2. Advantage

Figure 2:
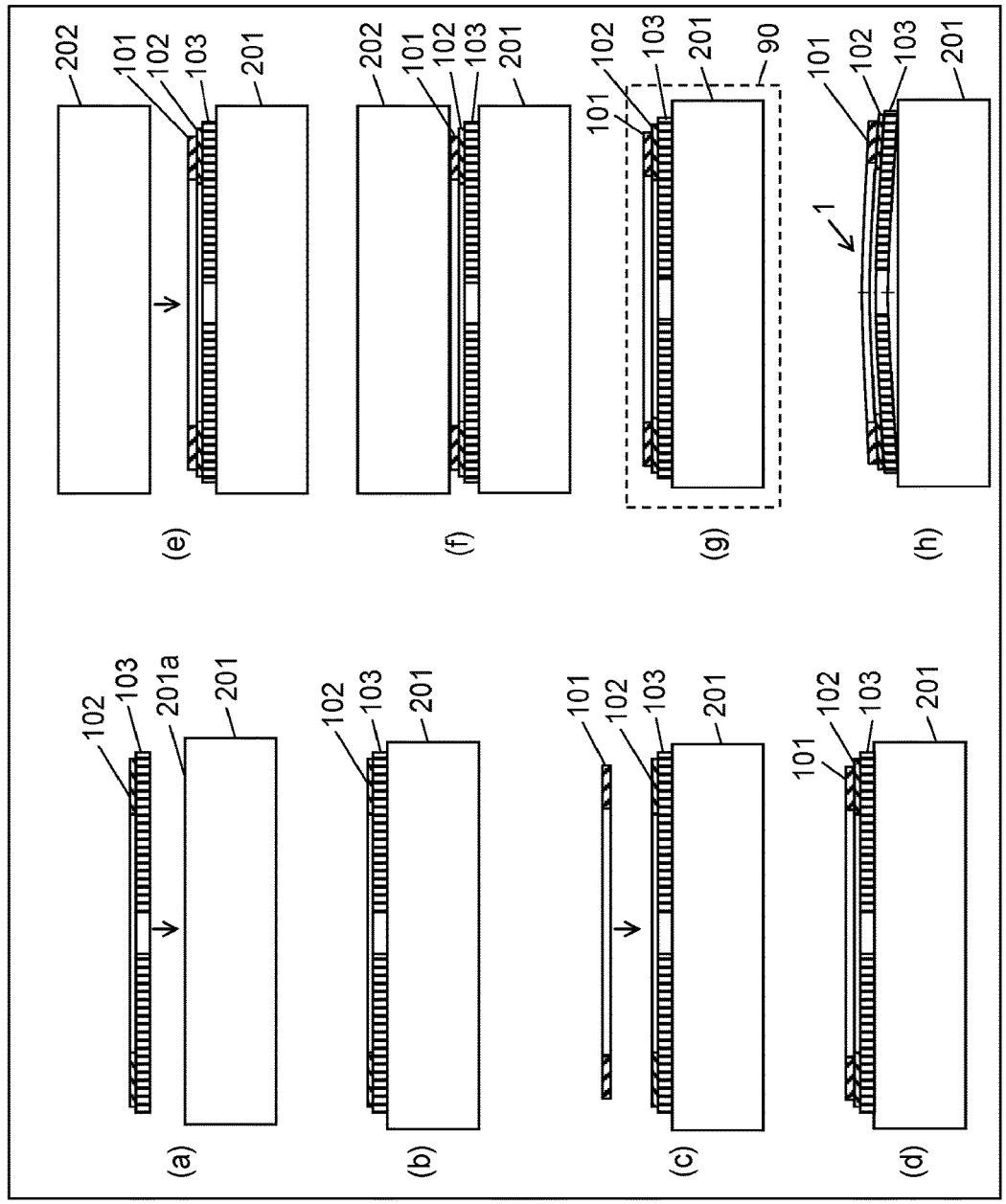
FIG. 2 shows an example of a method for manufacturing the phosphor disc in accordance with the first embodiment.
Figure 3:
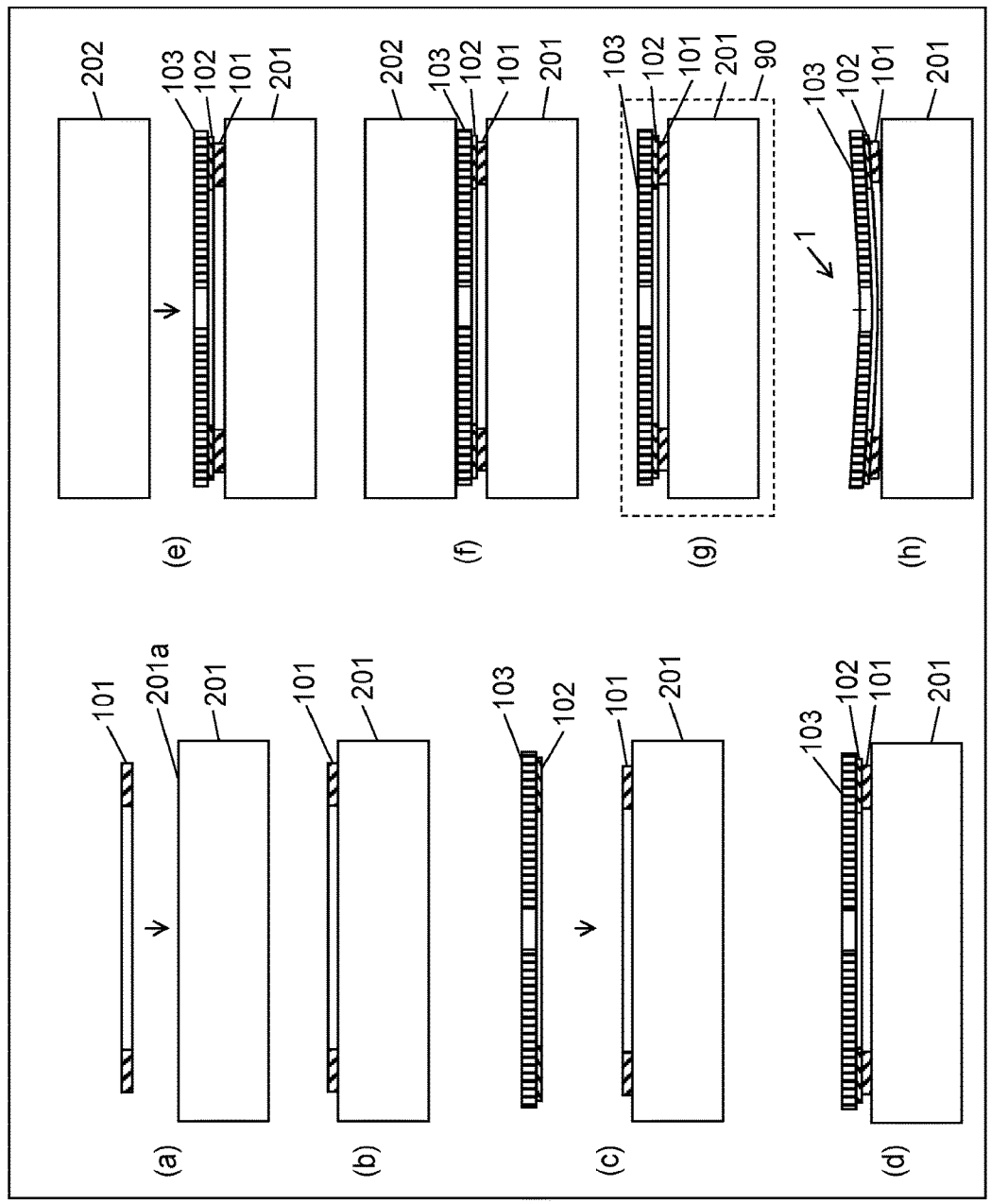
FIG. 3 shows another example of the method for manufacturing the phosphor disc in accordance with the first embodiment.

Shapes and advantages of phosphor disc 1 manufactured by the methods shown in FIG. 2 and FIG. 3 are described hereinafter with reference to FIG. 4A and FIG. 4B. First, FIG. 4A shows sectional views of phosphor disc 1 cut along a diameter line, and illustrates curving states of phosphor disc 1 at (a) the temperature employed during the normal use, (b) a temperature higher than the normal use temperature, and (c) a room temperature, viz. a temperature lower than the normal use temperature.

Figure 4A:
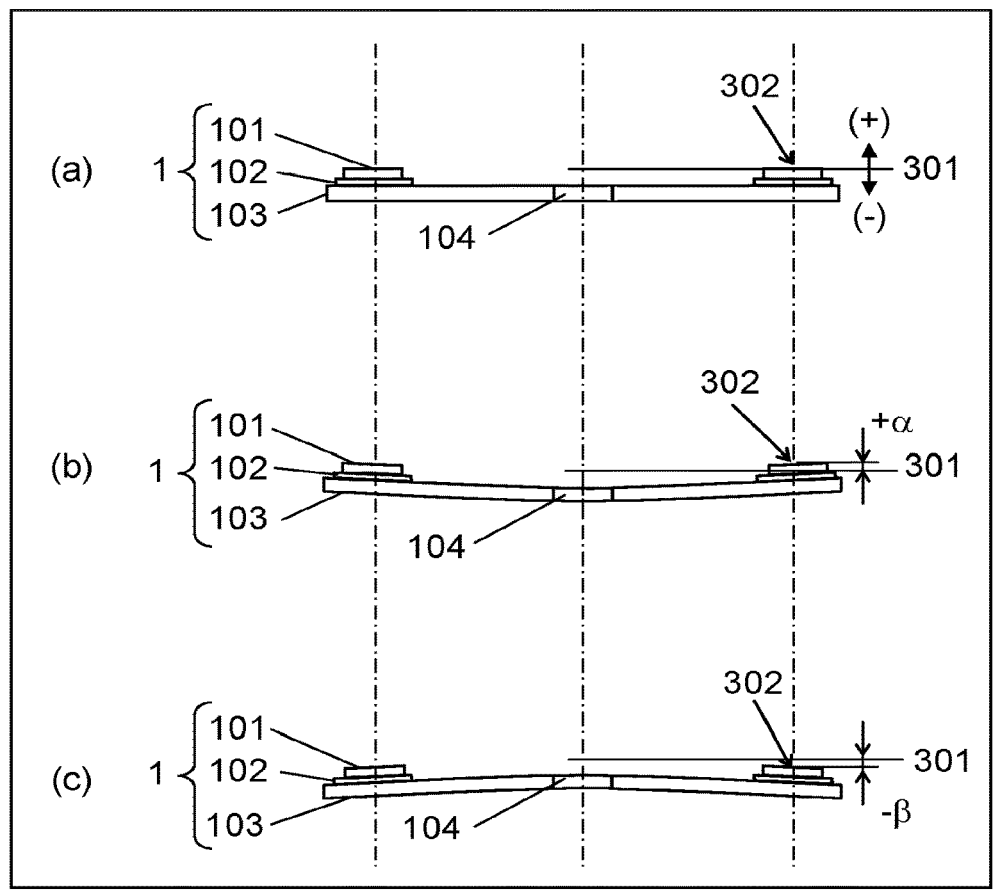
FIG. 4A illustrates curves of the phosphor disc at some temperatures.

To match the normal use temperature with a curing temperature, allows phosphor disc 1 to be flat at the normal use temperature as shown in FIG. 4A (a). Phosphor ring 101 is irradiated with a laser beam as excitation light supplied from a semiconductor laser (this is detailed later). The irradiation point 302 of the excitation light on phosphor ring 101 is used as reference position 301, and displacement direction, caused by the curve, of irradiation point 302 toward (+) and (−) is shown as the arrows in FIG. 4A (a).

Figure 4B:
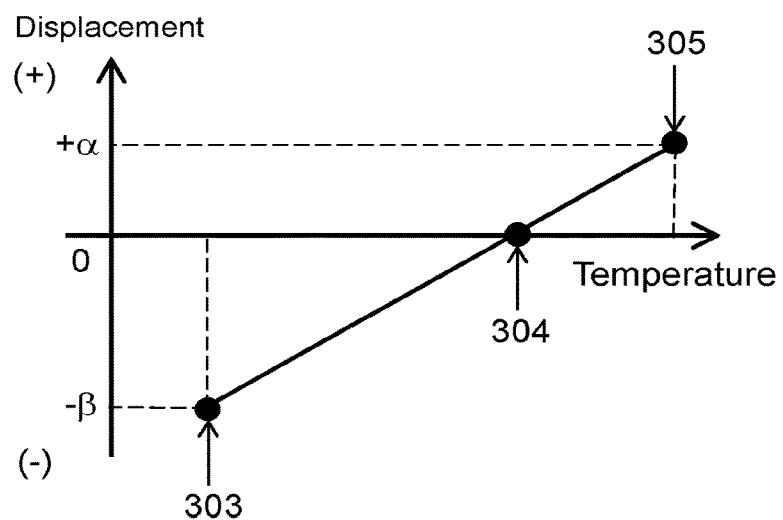
FIG. 4B shows a relation between temperatures and displacements of the phosphor disc in accordance with the first embodiment.

FIG. 4B is a graph showing phosphor temperatures (° C.) on the lateral axis and displacement amounts at the irradiation spots of the excitation light on the vertical axis. Point 304 on this graph shows a status at the normal use temperature (i.e. curing temperature) shown in FIG. 4A (a).

FIG. 4A (b) shows a curving status of phosphor disc 1 at an upper limit temperature higher than the normal use temperature. Phosphor disc 1 curves concavely viz. the face of phosphor disc 1 on which phosphor ring 101 is disposed is recessed, caused by the difference in the linear expansion coefficients between phosphor ring 101 and metal plate 103. Irradiation point 302 thus is displaced by α toward (+) from reference position 301 of phosphor ring 101. Point 305 in the graph shown in FIG. 4B shows this status.

FIG. 4A (c) shows a curving status of phosphor disc 1 at the room temperature lower than the normal use temperature. Phosphor disc 1 curves convexly contrarily to what is shown in FIG. 4A (b), viz. the face of phosphor disc 1 on which phosphor ring 101 is disposed is protruded, caused by the difference in the linear expansion coefficients between phosphor ring 101 and metal plate 103. Irradiation point 302 thus is displaced by ß toward (−) from reference position 301 of phosphor ring 101. Point 303 in the graph shown in FIG. 4B shows this status.

Assume that no changes in the linear expansion coefficient or mechanical properties (e.g. Poisson ratio, Young's modulus) are found at the respective temperatures of phosphor ring 101, metal plate 103, and bonding layer 102, then points 303, 304, and 305 can be plotted on the same straight line as shown in FIG. 4B which shows the relation between the temperature and the displacement amount.

As discussed above, curing the phosphor disc 1 during the manufacturing process at approx. the same temperature as the normal use temperature allows maintaining phosphor disc 1 flat and free from deformation during the normal use.

1-3. Light Source Device Used in Phosphor Disc in Accordance with the First Embodiment Light source device 4, employing phosphor wheel 100 formed of phosphor disc 1 in accordance with the first embodiment, is detailed hereinafter with reference to FIG. 5.

First, phosphor wheel 100 is formed of phosphor disc 1 and motor 141 that drives to rotate phosphor disc 1.

Lights emitted from multiple first semiconductor lasers 402 are parallelized by collimator lenses 403 placed on the outgoing side of respective first semiconductor lasers 402. On the outgoing side of collimator lenses 403, convex lens 404 is disposed to gather the lights emitted from first semiconductor lasers 402 and supplied from multiple collimator lenses 403 so that the light beam can convergent. The outgoing light condenced by convex lens 404 enters diffuser 405 disposed on the outgoing side of convex lens 404. Diffuser 405 uniforms the light beam because the ununiformity of the outgoing light emitted from first semiconductor lasers 402 and supplied from collimator lens 403, remains by convex lens 404. The first semiconductor laser 402 is an example of an excitation light source.

The light outgoing from diffuser 405 enters concave lens 406, which parallelizes this incoming light from diffuser 405.

The parallelized light outgoing from concave lens 406 enters dichroic mirror 407 disposed on the outgoing side at 45 degrees with respect to the optical axis. Dichroic mirror 407 transmits the light of which wavelength range of the outgoing light emitted from first semiconductor lasers 402, while it reflects light of which wavelength range of fluorescent light supplied from phosphor wheel 100 that will be detailed later. Dichroic mirror 407 thus transmits the incoming light supplied from concave lens 406, and this transmitted light enters convex lenses 408, 409 in this order, whereby the light beam converges before entering phosphor wheel 100.

Phosphor wheel 100 is placed such that phosphor ring 101 forming the phosphor layer confronts convex lenses 408, 409. Phosphor ring 101, viz. phosphor layer, is placed on phosphor wheel 100 circumferentially, viz. equidistantly from the rotary center of phosphor wheel 100 as shown in FIG. 1A. Phosphor wheel 100 is placed such that rotation of phosphor disc 1 allows the phosphor layer to be irradiated with the light, emitted from first semiconductor laser 402 and converged by convex lenses 408 and 409, as an excitation light for exciting the phosphor. Collimator lens 403, convex lens 404, diffuser 405, concave lens 406, dichroic mirror 407, and convex lenses 408, 409 are examples of a light guide optical system.

The excitation light enters phosphor ring 101 (i.e. phosphor layer) from first semiconductor lasers 402, and is converted into fluorescent light having a wavelength range different from that of first semiconductor laser 402. At the same time, the excitation light changes its traveling path by 180 degrees and the fluorescent light outgoes toward convex lens 409. The fluorescent light enters convex lens 409, then enters convex lens 408 where the light is parallelized before entering dichroic mirror 407.

Dichroic mirror 407, as discussed previously, slants by 45 degrees with respect to the optical axis of the fluorescent light. Dichroic mirror 407 transmits the light of which wavelength range of the outgoing light from first semiconductor lasers 402, and reflects the light of which wavelength range of the fluorescent light supplied from phosphor wheel 100. The fluorescent light entering dichroic mirror 407 thus bends its travelling path by 90 degrees.

Next, the outgoing lights from multiple second semiconductor lasers 422 are parallelized by collimator lenses 423 disposed on the outgoing sides of respective second semiconductor lasers 422. On the outgoing side of collimator lenses 423, convex lens 424 is disposed for gathering and converging the light emitted from the second semiconductor lasers 422 and supplied from multiple collimator lenses 423. The outgoing light of which light beam has been condenced by convex lens 424 enters diffuser 425 disposed on the outgoing side of convex lens 424. Diffuser 425 uniforms the light beam, because this ununiformity still remains after the light beam has passed through convex lens 424.

The outgoing light from diffuser 425 enters concave lens 426, which parallelizes the light supplied from diffuser 425.

The parallelized outgoing light from concave lens 426 enters dichroic mirror 407 disposed on the outgoing side and slanting by 45 degrees with respect to the optical axis. The incident angle of this parallelized light on dichroic mirror 407 differs by 90 degrees from that of the fluorescent light supplied from phosphor wheel. Dichroic mirror 407 transmits the light of which wavelength range of the outgoing light from second semiconductor lasers 422, while it reflects the light of which wavelength range of the fluorescent light supplied from phosphor wheel 100. Dichroic mirror 407 thus transmits the light supplied from concave lens 426. As a result, the outgoing fluorescent light from phosphor wheel 100 and the outgoing light from the second semiconductor lasers 422 outgo along the same line.

The fluorescent light supplied from phosphor wheel 100 and the laser beam supplied from second semiconductor lasers 422 are converged by convex lens 410, and then enter rod-integrator 411 that is a light uniform means. The intensity distribution of the outgoing light from rod-integrator 411 is uniformed.

The wavelength of the outgoing light from second semiconductor lasers 422 is blue, while the wavelength of the outgoing light from first semiconductor lasers 402 is within ultraviolet light to blue light. The phosphor contained in phosphor ring 101 of phosphor wheel 100 can be excited by the light of which wavelength range of the light emitted from first semiconductor lasers 402, and this phosphor emits yellow fluorescent light of which wavelength includes both of the wavelength ranges of green and red.

The structure discussed above allows rod-integrator 411 of light source device 4 to emit white light of which intensity distribution is uniformed.

Figure 6:
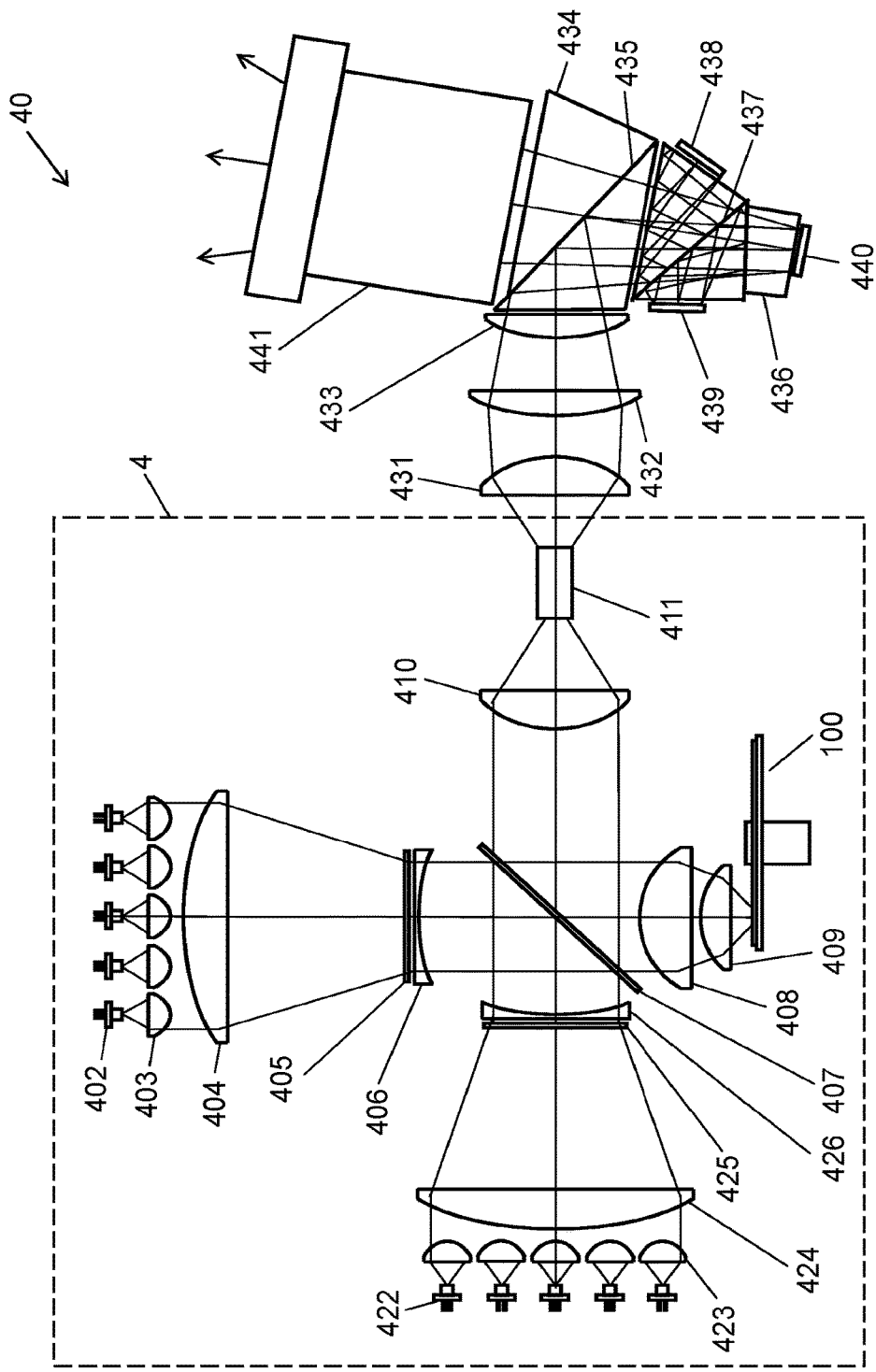
FIG. 6 shows a projection display apparatus including the light source device that uses the phosphor disc in accordance with the first embodiment.

1-4. Projection Display Apparatus Employing the Light Source Device Including the Phosphor Wheel in Accordance with the First Embodiment A structure of projection display apparatus 40 employing light source device 4 including phosphor wheel 100 in accordance with the first embodiment is described hereinafter with reference to FIG. 6.

Figure 5:
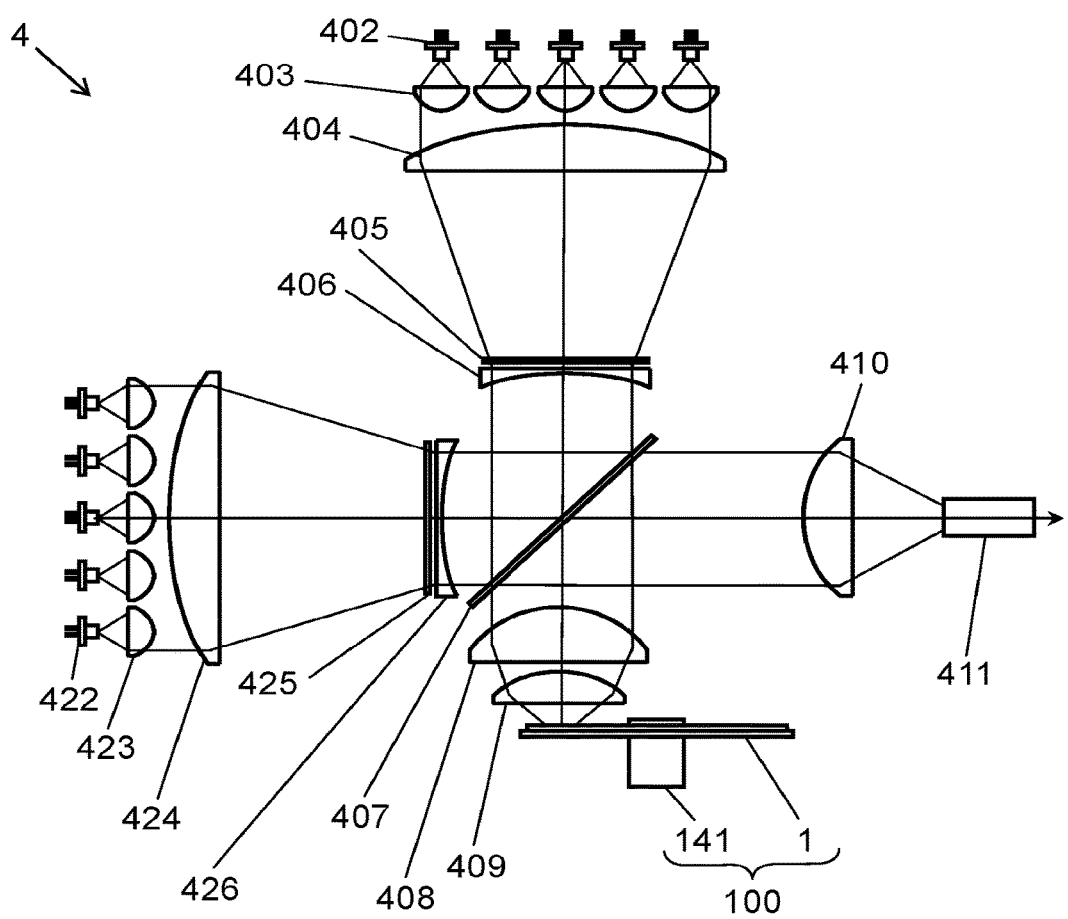
FIG. 5 shows a light source device using the phosphor disc in accordance with the first embodiment.

Projection display apparatus 40 employs light source device 4, described in FIG. 5, of which detail is omitted here to avoid duplication. The behavior of white light outgoing from rod-integrator 411 and the structure of projection display apparatus 40 are described hereinafter.

First, the white light outgoing from rod-integrator 411 maps the outgoing face of rod-integrator 411 onto DMDs (digital micro-mirror device) 438, 439, and 440 through a relay lens system formed of three convex lenses 431, 432, and 433. These DMDs are detailed later.

The light passing through the relay lens system (i.e. convex lenses 431, 432, and 433) enters total internal reflection prism 434 formed of two glass blocks with fine gap 435 there between. The light entering prism 434 reflects from fine gap 435, and then enters color prism 436 formed of three glass blocks. Color prism 436 includes fine gap 437 between the first glass block and the second glass block, and a dichroic layer on the first glass block side. This dichroic layer reflects light of which wavelength range of blue.

Among the white lights traveling from total internal reflection prism 434 and entering color prism 436, the light having a wavelength range of blue color reflects from the dichroic layer that reflects blue color light and is provided on the first glass block in front of fine gap 437 of color prism 436, and then totally reflects at a gap formed between color prism 436 and total internal reflection prism 434. The light then changes its traveling path before entering DMD 438 for blue color.

Next, the yellow light, passing through fine gap 437 of color prism 436 and containing the light of both ranges of red and green, is separated into red light and green light at a dichroic layer disposed at an interface between the second glass block and a third glass block of color prism 436. This dichroic layer reflects the light of which wavelength range of red color, while it transmits the light of which wavelength range of green color. The separated red light reflects from the dichroic layer and enters the second glass block, while the separated green light penetrates through the dichroic layer and enters the third glass block.

The red light reflects from the interface between the first glass block and the third glass block, and then enters, at an angle equal to or greater than a total reflection, fine gap 437 provided between the second glass block and the first glass block, thereby reflecting from fine gap 437, and then enters DMD 439 for red color. The green light entered the third glass block travels straightly, and then enters DMD 440 for color.

Three DMDs 438, 439, and 440 are driven by a video circuit (not shown), thereby turning on or off each one of pixels in response to image information, and changing a reflection path.

The light emitted from the pixels turned on of three DMDs 438, 439, and 440 travels through the foregoing path reversely, and is composited by color prism 436 to be white light before entering total internal reflection prism 434. This light then enters fine gap 435 of prism 434 at an angle equal to or smaller than a total reflection angle. Then the white light transmits through prism 434, and is magnified and projected onto a screen (not shown) by projection lens 441.

Figure 7A:
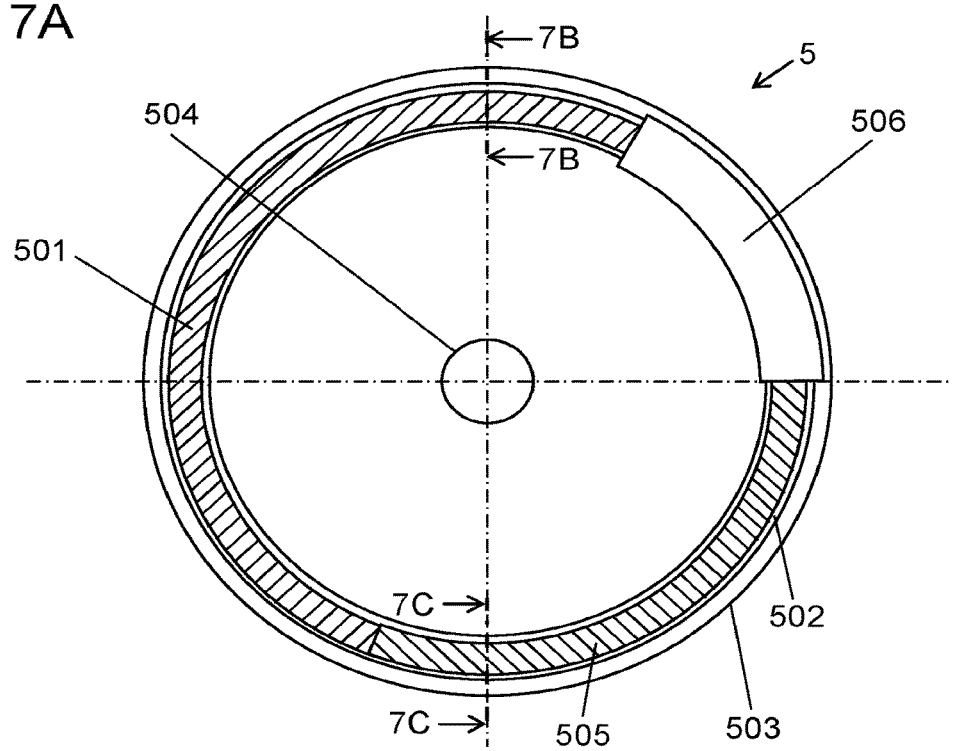
FIG. 7A shows a structure of a phosphor disc in accordance with the second embodiment.
Figure 7B:
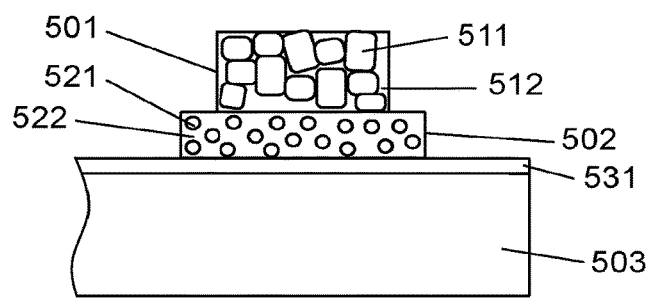
FIG. 7B is a sectional view of the phosphor disc cut along line 7B-7B in FIG. 7A.
Figure 7C:
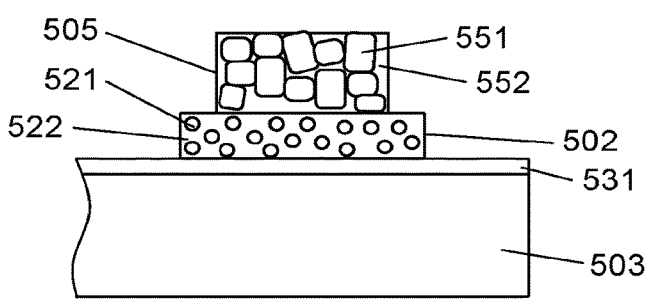
FIG. 7C is a sectional view of the phosphor disc cut along line 7C-7C in FIG. 7A.

Second Exemplary Embodiment 2-1. Structure of Phosphor Disc and Manufacturing Method Thereof A structure of a phosphor disc in accordance with the second embodiment is described hereinafter with respect to FIG. 7A-FIG. 7C. These drawings show the structure of phosphor disc 5 in accordance with the second embodiment. FIG. 7A is a plan view, FIG. 7B is a sectional view cut along line 7B-7B of FIG. 7A, and FIG. 7C is a sectional view cut along line 7C-7C of FIG. 7A.

Metal plate 503 of phosphor disc 5 is shaped like a disc made of aluminum, and mounting hole 504 is at the center of phosphor disc 5 for a rotary shaft of motor 541 (refer to FIG. 8) to be mounted. Mounting the motor 541 to metal plate 503 allows phosphor disc 5 to work as phosphor wheel 500, and motor 541 drives to rotate phosphor disc 5. At least on a surface of one side of metal plate 503, increased reflecting film layer 531 formed of an under coat and a top coat (not shown) is provided in order to increase a surface reflectance. Metal plate 503 is an example of a metal plate.

On increased reflecting film layer 531 of metal plate 503, bonding layer 502 is formed annularly except an opening section like a C-shaped ring, viz. equidistantly from the rotary center of metal plate 503 as shown in FIG. 7A. Bonding layer 502 has a constant width and thickness. Opening section 506 of the C-shaped ring is located as a part of the same annular shape of bonding layer 502.

On bonding layer 502, as shown in FIG. 7A, phosphor ring segments 501 and 505 are provided such that each of these two ring segments shares the C-shaped ring with bonding layer 502 formed partially with each other measured by given angles with respect to the rotary center.

Next, phosphor disc 5 is detailed hereinafter with reference to FIG. 7B and FIG. 7C.

Bonding layer 502 contains particles 521 in resin silicone 522 for increasing the reflectance and the heat conductivity. In this second embodiment, the particles 521 are made of titanium oxide.

Phosphor ring segment 501 is made of mixture of phosphor 511 (inorganic phosphor) and alumina 512. Phosphor ring segment 505 is made of mixture of phosphor 551 (inorganic phosphor) and alumina 552. Phosphor ring segments 501 and 505 are sintered into the C-shaped ring. Sintered phosphor ring segments 501 and 505 are rigidly bonded to metal plate 503 with bonding layer 502. Phosphors 511 and 551 have different spectrums when they emit light. For instance, phosphor ring segment 501 emits yellow fluorescent light, and phosphor ring segment 505 emits green fluorescent light. Nevertheless the spectrum of the fluorescent light is not limited to the foregoing instance. Phosphor ring segments 501 and 505 are examples of the phosphor layer.

Bonding layer 502 is preferably made of thermosetting resin silicone because this material can reduce a distortion caused by a difference in liner expansion coefficients between metal plate 503 and phosphor ring segments 501, 505 forming the phosphor layer. This structure allows maintaining the structure of the phosphor wheel. Considering the characteristics of reducing the distortion, it is preferable to use dimethyl based thermosetting resin silicone in the bonding layer.

Phosphor disc 5 in accordance with the second embodiment can be manufactured by the manufacturing processes shown in FIG. 2(a)-FIG. 2(h), or FIG. 3(a)-FIG. 3(h) which are used in the first embodiment; however, it should be noted that phosphor disc 5 has multiple phosphor ring segments, which differ from phosphor disc 1 in accordance with the first embodiment.

2-2. Advantage

The linear expansion coefficient of phosphor ring segments 501, 505 is substantially smaller than that of metal plate 503, so that phosphor wheel 500 in accordance with the second embodiment shows the relation between temperature and the displacement amount similar to that shown in FIG. 4A and FIG. 4B.

Curing the phosphor disc 5 during the manufacturing process at approx. the same temperature as the normal use temperature allows maintaining phosphor disc 5 flat and free from deformation during the normal use.

2-3. Light Source Device Employing Phosphor Wheel in Accordance with the Second Embodiment Light source device 6 employing phosphor wheel 500 in accordance with the second embodiment is detailed hereinafter with reference to FIG. 8.

First, phosphor wheel 500 is formed of phosphor disc 5 and motor 541 that drives to rotate phosphor disc 5.

Lights emitted from multiple first semiconductor lasers 602 are parallelized by collimator lenses 603 placed on the outgoing side of respective semiconductor lasers 602. On the outgoing side of collimator lenses 603, convex lens 604 is disposed to gather the lights emitted from semiconductor lasers 602 and supplied from multiple collimator lenses 603 so that the light beam can convergent. The outgoing light condensed by convex lens 604 enters diffuser 605 disposed on the outgoing side of convex lens 604. Diffuser 605 uniforms in the light beam. This ununiformity cannot be eliminated by convex lens 604 and still remain in the outgoing light emitted from semiconductor lasers 602 and supplied from collimator lens 603. The semiconductor laser 602 is an example of an excitation light source.

The light outgoing from diffuser 605 enters concave lens 606, which parallelizes this incoming light from diffuser 605.

The parallelized light outgoing from concave lens 606 enters dichroic mirror 607 disposed on the outgoing side at 45 degrees with respect to the optical axis. Dichroic mirror 607 transmits the light of which wavelength range of the outgoing light emitted from semiconductor lasers 602, while it reflects light of which wavelength range of fluorescent light supplied from phosphor wheel 500. Dichroic mirror 607 thus reflects the incoming light from concave lens 606, and transmits the incoming light supplied from concave lens 606, and this reflected light enters convex lenses 608, 609 in this order, whereby the light beam converges before entering phosphor wheel 500.

Phosphor wheel 500 is placed such that phosphor ring segments 501 and 505 confront convex lenses 608 and 609.

As FIG. 7A shows, phosphor wheel 500 includes first phosphor ring segment 501, second phosphor ring segment 505, and opening section 506 on the circumference equidistant from the rotary center of phosphor wheel 500. The rotation of phosphor disc 5 allows irradiating segments 501, 505, and opening section 506 in time-series order with the light emitted from semiconductor laser 602 and converged by convex lenses 608, 609. Collimator lens 603, convex lens 604, diffuser 605, concave lens 606, dichroic mirror 607, and convex lenses 608, 609 are examples of the light-guide optical system.

Irradiation of the laser beam following the order discussed above causes the behavior below:

First, when first phosphor ring segment 501 is irradiated with the laser beam, the light emitted from semiconductor laser 602 is converted into the first fluorescent light, having a different wavelength from the original light, by segment 501, and then outgoes toward convex lens 609. In this context, assume that the first fluorescent light is yellow range light having an emission spectrum covering red and green ranges. The light entering convex lens 609, then enters convex lens 608 where the light is parallelized before entering dichroic mirror 607.

Second, when second phosphor ring segment 505 is irradiated with the light emitted from the semiconductor laser, the light emitted from semiconductor laser 602 is converted into the second fluorescent light having a wavelength different from the light emitted from semiconductor laser 602 and also different from the first fluorescent light. The second fluorescent light then outgoes to convex lens 609. In this context, assume that the second fluorescent light is light of which wavelength falls within the wavelength range of green. The second fluorescent light entering convex lens 609, then enters convex lens 608 where the light is parallelized before entering dichroic mirror 607.

Finally, when opening section 506 is irradiated with the light from semiconductor laser 602, the light passes through phosphor wheel 500, and enters convex lenses 610, 611 in this order, and is parallelized before outgoing.

The outgoing light from convex lenses 610, 611 travels through the relay optical system, where the light changes its traveling path and is parallelized again. This relay optical system is formed of three mirrors 612, 614, 616 and three lenses 613, 615, 617. The parallelized light then enters dichroic mirror 607 at an angle different by 90 degrees from the first and the second fluorescent lights.

Dichroic mirror 607 thus receives, in a time-series manner, the first fluorescent light, the second fluorescent light, and the light emitted from semiconductor laser 602 and coming along a line different by 90 degrees from the first and second fluorescent lights. Dichroic mirror 607 reflects the light of which wavelength range of the light emitted from semiconductor laser 602, while it transmits the light of which wavelength range of the first and second fluorescent lights. The light emitted from semiconductor laser 602 thus changes its traveling path by 90 degrees, so that the light outgoes along the same line as the first and second fluorescent lights before entering convex lens 618, where the light beam is converged. To be more specific, the first fluorescent light (i.e. yellow light), the second fluorescent light (i.e. green light), and blue light from semiconductor laser 602 outgo sequentially.

The light converged by convex lens 618 enters color wheel 619. Phosphor wheel 500 and color wheel 619 are controlled by a synchronizing circuit and a wheel drive circuit (not shown) such that color wheel 619 can match a region in the first fluorescent light (i.e. yellow light), through this region only red color region transmits, with at least a part of an entering timing of the first phosphor light.

The structure discussed above allows the light passing through color wheel 619 to emit sequentially the first fluorescent light (i.e. yellow light), red light derived from the first fluorescent light and passing through the red color region of color wheel 619, the second fluorescent light (i.e. green light), and the blue light of semiconductor laser 602. These lights then enter rod-integrator 620 that works as a light uniform means.

In the foregoing description, the first fluorescent light is yellow light, the second fluorescent light is green light, and the laser light is blue light; however, the first fluorescent light can be red light, or multiple opening sections can be provided so that the first phosphor ring segment is not always adjacent to the second phosphor ring segment although these segments are adjacent to each other in FIG. 7A. The number of the phosphor segments is two in the foregoing description; however, the number can be one, three or more than three. The semiconductor laser emits ultraviolet light instead of blue light, and phosphor wheel 500 includes a third phosphor ring segment instead of the opening section, and this third segment can emit blue light.

Color wheel 619 can include a red color transmitting region and a green color transmitting region. Phosphor wheel 500 has only one phosphor ring segment applicable to a yellow color wavelength range.

Figure 9:
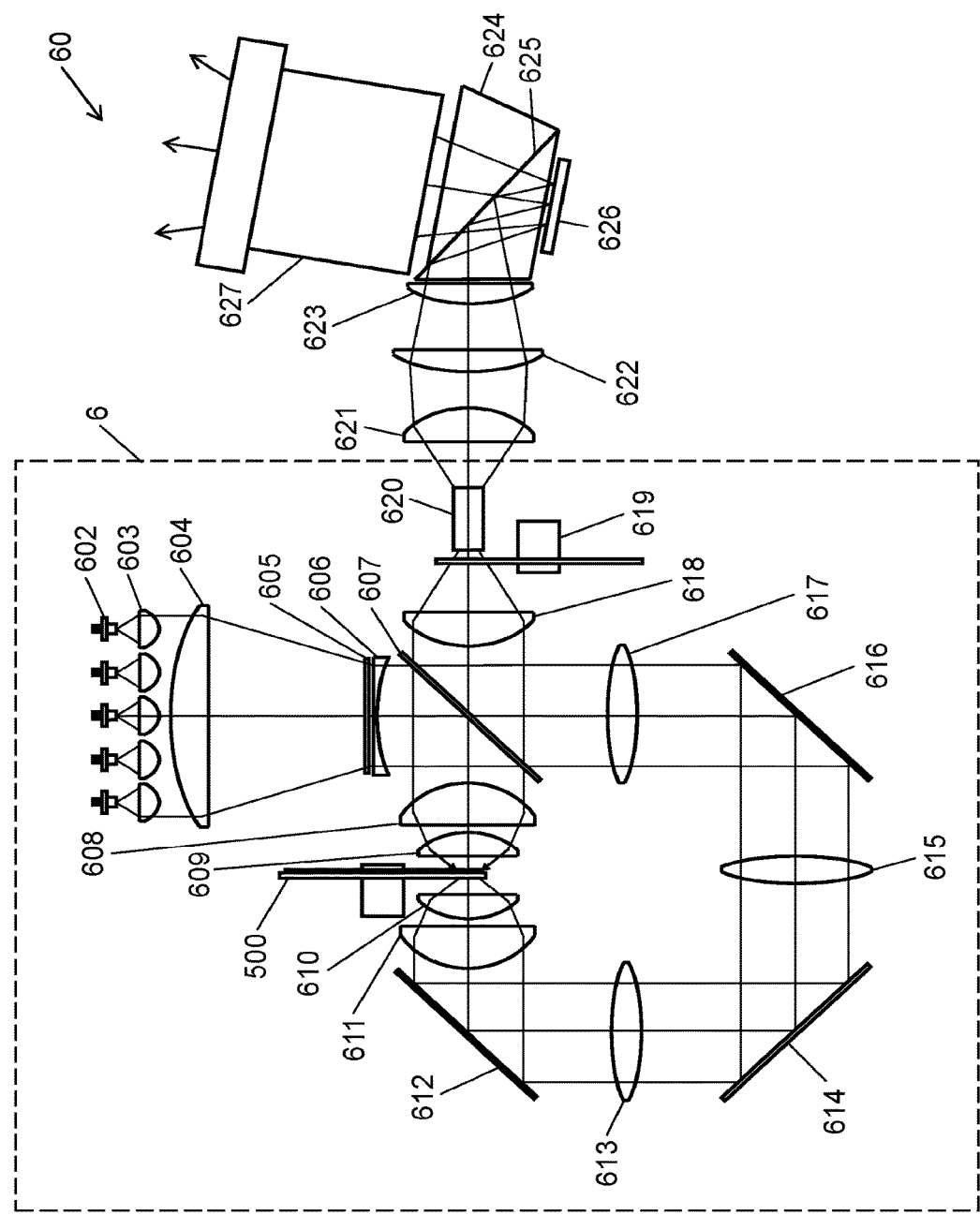
FIG. 9 shows a projection display apparatus including the light source device that uses the phosphor disc in accordance with the second embodiment.

2-4. Projection Display Apparatus Employing Light Source Device Including a Phosphor Wheel Used in the Second Embodiment A structure of projection display apparatus 60 employing light source device 6 including phosphor wheel 500 in accordance with the second embodiment is detailed hereinafter with reference to FIG. 9.

Figure 8:
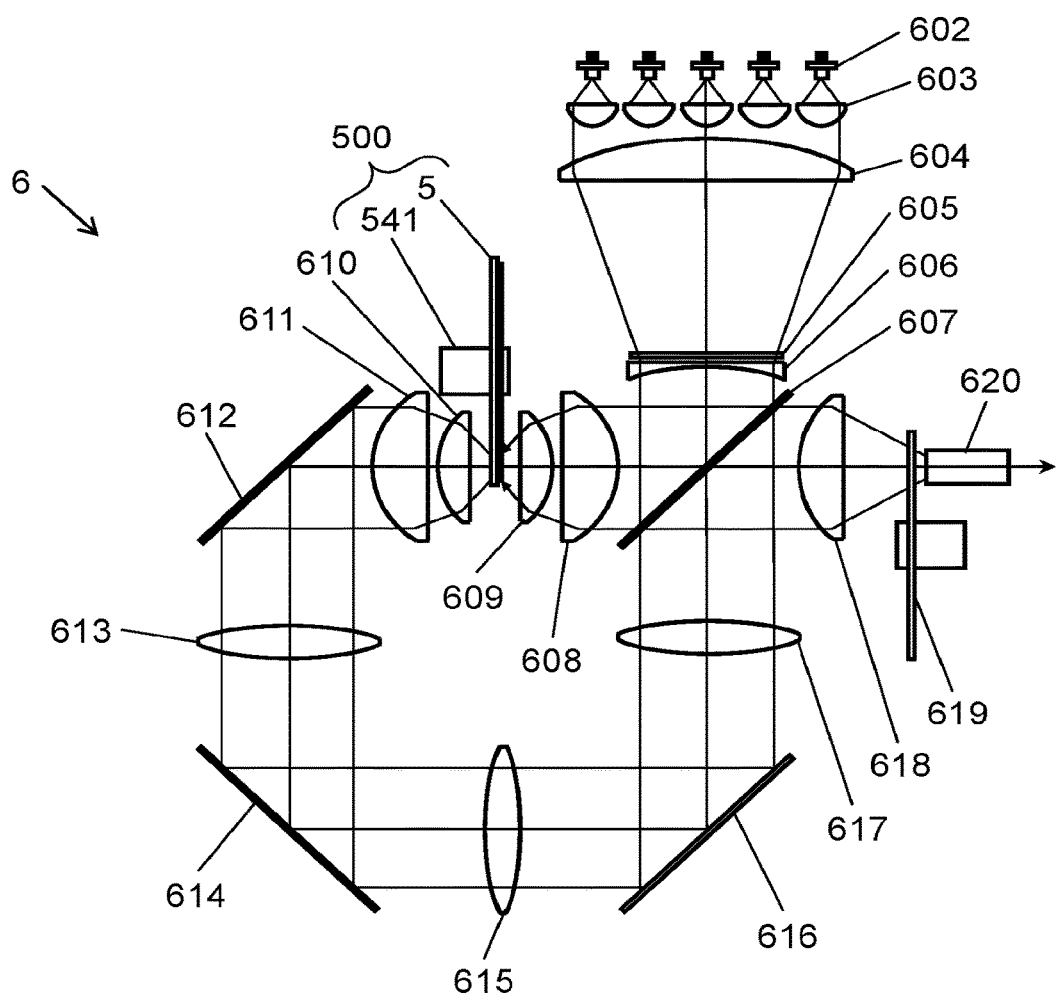
FIG. 8 shows a light source device using the phosphor disc in accordance with the second embodiment.

Projection display apparatus 60 employs light source device 6 described in FIG. 8, so that the detailed description of light source device 6 is omitted here. The following description details the behavior of the outgoing light from rod-integrator 620. The wavelength of this outgoing light changes in a time-series manner. The structure of projection display apparatus 60 is also described hereinafter.

First, the outgoing white light from rod-integrator 620 maps the outgoing face of rod-integrator 620 onto DMD 626 (detailed later) through the relay lens system formed of three convex lenses 621, 622, and 623.

The light passing through convex lenses 621, 622, and 623 that form the relay lens system enters total internal reflection prism 624 formed of two glass blocks including fine gap 625 there between. The light entering prism 624 enters fine gap 625 at an angle equal to or greater than the total reflection angle, whereby the light totally reflects, and then enters DMD 626.

DMD 626 is provided with a video signal synchronized with phosphor wheel 500 and color wheel 619 by a circuit (not shown), thereby turning on or off each one of pixels in response to image information, and changing a reflection path of the light incident to DMD 626.

The light emitted from the pixels of DMD 626 turned on enters total internal reflection prism 624, and then this light enters fine gap 625 of prism 624 at an angle equal to or smaller than the total reflection angle, and passes through prism 624. Then the white light is projected onto a screen (not shown) by projection lens 627.

INDUSTRIAL APPLICABILITY

The present disclosure is applicable to a light source of a projection display apparatus.

What is claimed is:

1. A fluorescent light emitter comprising:
   a substrate including a reflection surface for reflecting light;
   a bonding layer disposed on the reflection surface and including silicone resin; and
   a phosphor layer disposed on the bonding layer, wherein the substrate is curved toward a side of the reflection surface.

2. The fluorescent light emitter according to claim 1, wherein a material of the substrate is metal.

3. The fluorescent light emitter according to claim 2, wherein the metal is aluminum, and the phosphor layer is made of inorganic phosphor.

4. A phosphor wheel device comprising:
   the fluorescent light emitter as defined in claim 1; and
   a motor mounted to a side of the substrate for rotating the fluorescent light emitter.

5. A light source device comprising:
   an excitation light source;
   the phosphor wheel device as defined in claim 4; and
   an optical system configured to guide outgoing light from the excitation light source to the phosphor layer,
   wherein the outgoing light from the excitation light source prompts the phosphor layer to emit fluorescent light.

6. A projection display apparatus comprising:
   the light source device as defined in claim 5; and
   a projection optical system configured to project the emitted light from the phosphor layer.

7. The fluorescent light emitter according to claim 1, wherein the silicone resin is a thermosetting resin.

8. A light source device comprising:
   a phosphor wheel device including a fluorescent light emitter and a motor, the fluorescent light emitter including a substrate having a reflection surface for reflecting light and a phosphor layer disposed on the reflection surface, wherein the motor is mounted to the substrate for rotating the fluorescent light emitter;
   an excitation light source configured to prompt the phosphor layer to emit fluorescent light; and
   an optical system configured to guide outgoing light from the excitation light source to the phosphor layer, wherein the substrate is curved toward a last element of the optical system.

9. The light source device according to claim 8, wherein a material of the substrate is metal.

10. The light source device according to claim 9, wherein the metal is aluminum, and the phosphor layer is made of inorganic phosphor.

11. A projection display apparatus comprising:
the light source device as defined in claim 8; and
a projection optical system configured to project the emitted fluorescent light of the phosphor layer.

12. The light source device according to claim 8, wherein substrate includes a bonding layer disposed on the reflection surface, and the bonding layer includes silicone resin.

13. The light source device according to claim 12, wherein the silicone resin is a thermosetting resin.

* * * * *